United States Patent
Ito

[11] 3,811,021
[45] May 14, 1974

[54] AUTOMATIC RESET HYDRAULIC SWITCH
[75] Inventor: Shinya Ito, Tsushima, Japan
[73] Assignee: Kabushiki Kaisha Tokai Rika Denki Seisakusho, Nishikasugai-gun, Aichi-ken, Japan
[22] Filed: Dec. 29, 1972
[21] Appl. No.: 319,616

[30] Foreign Application Priority Data
Dec. 30, 1971 Japan............................... 46-2115

[52] U.S. Cl. ............................................. 200/82 D
[51] Int. Cl. ........................................... H01h 35/38
[58] Field of Search ............... 200/82 D, 82 R, 81.5

[56] References Cited
UNITED STATES PATENTS
3,602,883   8/1971   Belart ........................... 200/82 D X
3,632,924   1/1972   Harper........................... 200/82 D
3,593,267   7/1971   Klein............................. 200/82 D X
3,228,194   1/1966   Blair.......................... 200/82 D UX
2,764,176   9/1956   Darquier.................... 200/82 D UX

*Primary Examiner*—Robert K. Schaefer
*Assistant Examiner*—Robert A. Vanderhye
*Attorney, Agent, or Firm*—Craig & Antonelli

[57] ABSTRACT

A hydraulically controlled, automatically resetting switch comprising two pressure responsive means, the first one of which is actuated upon there being a pressure difference between two hydraulic brake systems caused by failure in one of the systems and actuates the second pressure responsive means, which actuates a switch controlling an alarm device circuit until the failure is repaired, at which time the second pressure responsive means is moved away from the switch actuating position by hydraulic pressure communicated to it from the first pressure responsive means.

3 Claims, 3 Drawing Figures

PATENTED MAY 14 1974 3,811,021
FIG. 1
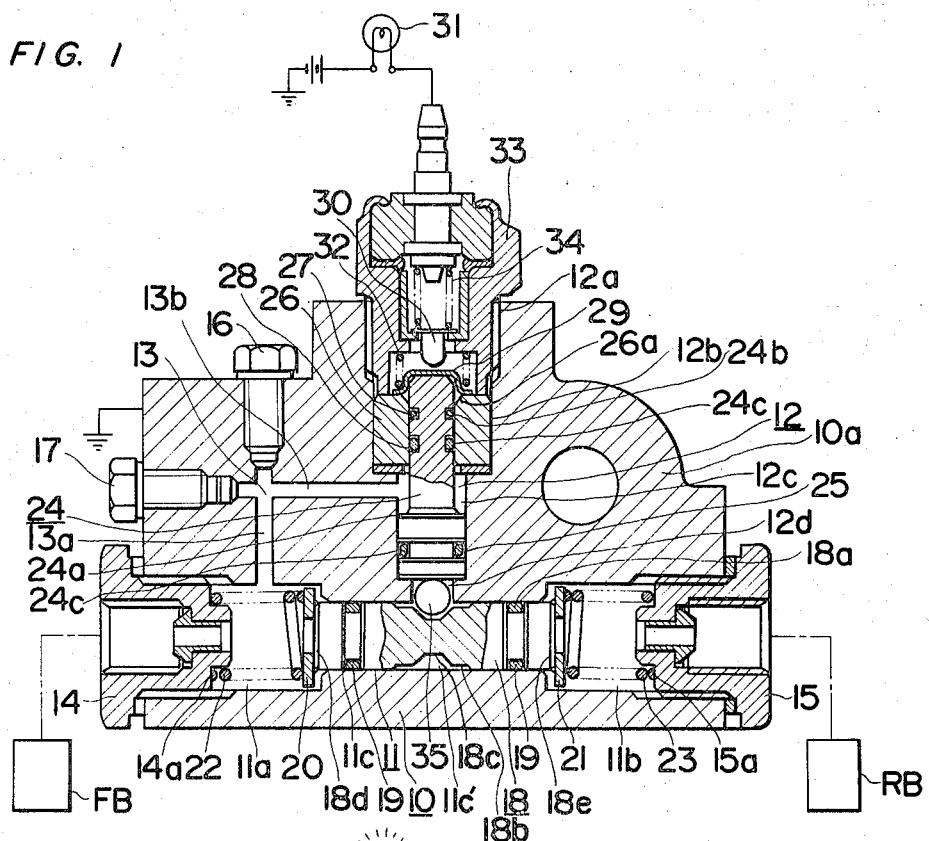
FIG. 2
FIG. 3
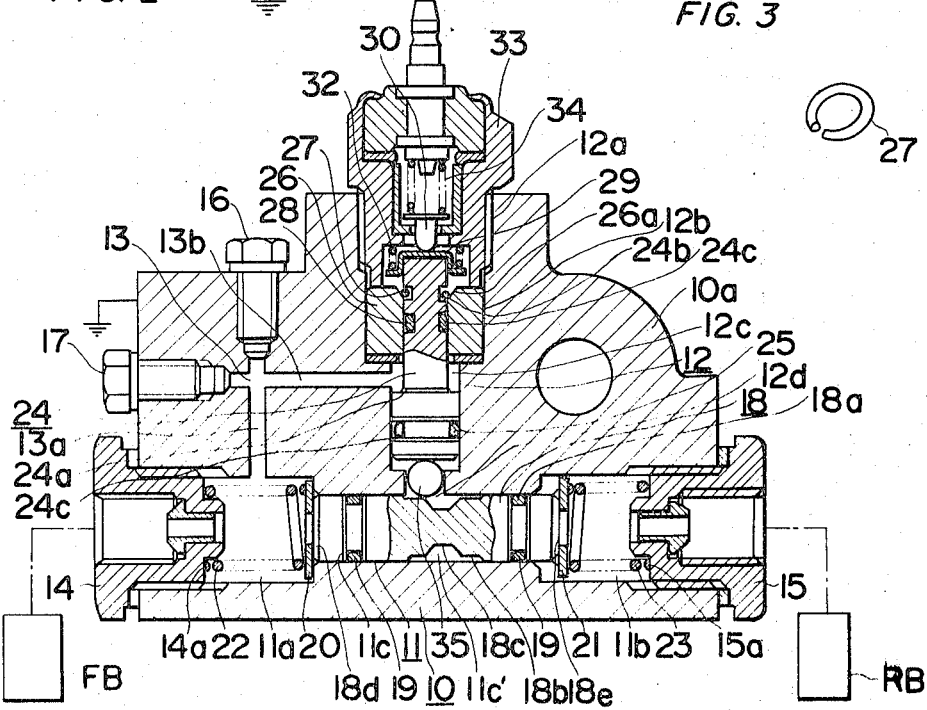

AUTOMATIC RESET HYDRAULIC SWITCH

The present invention relates to an automatic reset hydraulic switch by which a brake failure warning device is actuated and which is itself actuated when the pressure differential between two separate hydraulic brake systems connected through the switch rises above a certain level and is reset after repair of the brakes.

In motor vehicles it is currently becoming standard practice, as a safty measure, to provide two independent braking systems, usually hydraulic and controlled by the same brake pedal, for front and rear wheel assemblies respectively. A further safety measure which is also becoming common is the provision of a means for indicating failure in either the front or rear wheel brake system. Typically such conventional means comprise a pressure sensitive valve or piston whose either end is in connection with a separate brake system and which actuates an alarm device circuit, and the principle of their operation is that due to the generally equal and opposing forces of hydraulic pressure from the two brake systems and springs acting at either end of the piston, the pressure sensitive piston is normally held in a neutral position, from which it is moved when there is a relative increase in pressure on one side due to loss of pressure at the other side, resulting from brake fluid leakage or failure in the brake system to which the other side is connected, and as the piston is moved out of its neutral position it actuates a warning display circuit by coming into contact with a circuit contact, push-button, etc. However, such means depend for their operation on the pressure differential between two brake systems and have the fundamental disadvantage that although a warning is given upon brake fluid leakage in one system if this leakage is followed by leakage in the second brake system, hydraulic pressure is removed from both its ends and the alarm circuit actuating piston is returned to its neutral position by the mutually opposing and equal forces of the springs with which it is provided at either end, with the result that the alarm device is turned off, and this even if there is complete loss of brake fluid in both front and rear system. This problem has been recognized and means to overcome it devised, such conventional means usually comprising an arrangement whereby an alarm circuit control switch initially actuated through pressure differential between two separate hydraulic brake systems is held locked into position regardless of subsequent equalization of pressure between the two systems. However, this also has disadvantage in that, even after a brake failure has been repaired the alarm continues and does not stop until it has been reset manually. Thus, conventional devices have disadvantages in that they may either fail to give a warning when there is a brake failure or continue to give a brake failure warning after brakes have been repaired.

It is accordingly a main object of the present invention, in order to overcome the disadvantages inherent in conventional devices, to present a device which indicates brake failure in either of two independent hydraulic brake systems, and continues to give warning until such failure is repaired, at which time, but not before, the alarm actuating switch is automatically reset.

It is also an object of this invention to provide such a device as described above using only conventional elements and in a construction that is both simple and compact.

These and other objects and features of the present invention will become apparent from the following description of one preferred embodiment of this invention with reference to the attached drawings wherein:

FIG. 1 is a cross-sectional view of the device of this invention illustrating the non-alarm configuration, FIG. 2 is another cross-sectional view illustrating the configuration when an alarm is being given, and FIG. 3 is a perspective view of a lock ring employed in the device of FIG. 1.

Before the discription proceeds it is to be noted that in the attached drawings like numbers refer to like parts and in the description of the parts and their functions directions or positions up, down, right, etc. are in respect of the plane of the attached drawings.

Referring now to FIGS. 1 and 2, reference numeral 10 shows a housing provided with a lug portion 10a, for convenient mounting within an equipment, a first bore 11, a second bore 12 connected to the first bore 11 and a passage 13 connecting the first bore 11 and the second bore 12.

The first bore 11 extends in the straight through the housing 10 parallel and close to the bottom side of the housing 10 and is symmetrically counter-bored at each 11a, 11b, where it is provided with a plug, 14 and 15, respectively, which block the first bore 11 but do not fill the counterbore portions 11a, 11b, respectively, and through which connection can be made to separate hydraulic brake systems FB and RB. The second bore 12 leads at right-angles from the central portion 11c of the first bore 11 to the surface of the housing 10 and has stepped diameters, consisting of a large diameter portion 12a nearest to the surface of the housing 10, an intermediate diameter portion 12b between the large diameter portion 12a and a small diameter portion 12c, and a smallest diameter portion 12d which connects with the central portion 11c' of the first bore small diameter portion 11c. The passage 13 connects the second bore small diameter portion 12c and the first bore counter-bore portion 11a at a point inward of the inner face of the plug 14 blocking that end of the first bore 11. The passage 13 can be conveniently formed by boring two intersecting holes 13a, 13b from the outer surface of the housing 10, one to the first bore counterbore portion 11a and the other to the second bore small diameter portion 12 c, and then blocking the outer ends of the holes by seal bolts 16, 17 or any other suitable means.

Numeral 18 represents a first piston whose length and diameter are approximately the same as those of the first bore central portion 11c, into which it is slidably fitted, having near each end a groove 18a into which is inserted a piston ring 19, and whose central portion is waisted, forming two smaller diameter portions 18b, 18c, the smallest diameter portion 18c being smaller in diameter than the smaller diameter portion 18b and being formed in the most central portion of the smaller diameter portion 18b. Numerals 20 and 21 denote stop plates, which, respectively, are held against the end faces 18d and 18e of the first piston 18 by compression springs 22 and 23, the other ends of which are in contact with the inside faces 14a and 15a of the plugs 14 and 15 respectively, the springs 22, 23 urging the piston 18 to the right and left respectively with equal force, so that unless otherwise compelled the piston 18 is held in a central position within the first bore 11 and the smallest diameter portion 18c of the piston 18 is faced to the smallest diameter portion 12d of the second bore 12, as shown in FIG. 1.

Numeral 24 indicates a second piston having a large diameter portion 24a and a small diameter portion 24b; the large diameter portion 24a is slidably fitted into the second bore small diameter portion 12c and has a groove 24c into which is inserted a piston ring 25; the small diameter portion 24b is smaller in diameter than the second bore small diameter portion 12c and is slidably fitted in a sleeve 26 which is fixedly mounted in the second bore intermediate diameter portion 12b and whose inside passage is flared at the top 26a, and has two grooves 24b, 24c a lock ring 27 shown in FIG. 3, whose function will be described below, being inserted in the upper groove 24b and a piston ring 28 in the other 24c. Numeral 29 is a contact cap fitted on the upper end of the second piston 24 for contacting a plunger 30 to actuate a circuit as one switch which causes a brake failure warning lamp 31 to light up, from which contact it is, however, withheld during normal functioning of the brakes by a spring 32 one end of which presses against the contact cap 29 and the other end of which is in contact with a switch body 33 which is fixedly mounted in the second bore large diameter portion 12a and in the centre of the lower end of which is slidably mounted the plunger 30, urged to and, above the contact cap 29 by a spring 34. Numeral 35 shows a steel ball whose diameter is slightly less than that of the second bore smallest diameter portion 12d and which during normal functioning of the brakes, at which time the first piston 18 is positioned centrally in the first bore 11, lies in the first piston small diameter portion 18c, in which position it is not in contact with the second piston 24.

In the above-mentioned arrangement supposing that the left-hand side of the first bore 11 is in connection with the front wheel system of a dual hydraulic brake system FB through the plug 14 and the right-hand side with the rear wheel brake system RB through the plug 15, if now, when the brake pedal (not shown) is applied, the rear brake system RB fails, hydraulic pressure against the first piston end surface 18d is increased relative to that against the other end surface 18e, and as it is increased beyond a certain degree the first piston 18 is pushed, as shown in FIG. 2, toward the right against the tensile force of the compression spring 23, and as it is thus moved the steel ball 35 is forced from the first piston small diameter portion 18c into the small diameter portion 18b, and being thus raised pushed against and raises the second piston 24, which in its turn pushes against and raises the contact cap 29 until it comes into contact with the plunger 30, which causes the brake warning lamp 31 to light up. Also, as the second piston 24 is thus raised the lock spring 27 in its small diameter portion comes level with the sleeve flared portion 26a, at which point it opens out sufficiently not to be fully enclosed in the second piston upper groove 24b, and thus provides a locking force retaining the second piston 24 in a raised position which must be overcome before the second piston 24 can be lowered. Owing to this locking force even if leakage in the rear brake system RB is followed by leakage in the front brake system FB resulting in equalization of pressure at either end of the first piston 18, which would then be restored to a central position in the first bore 11 by the action of the equal, opposed springs 22, 23, which would allow the steel ball 35 to move from the first piston small diameter portion 18b to the smallest diameter portion 18c and thus no longer hinder downward movement of the second piston 24, the second piston 24 is prevented from moving downwards, since there is no pressure on the upper face of its large diameter portion 24a to overcome the locking force of the lock spring 27 and cause it to do so.

When the brake system or systems are repaired, pressure at either end of the first piston 18 is equal so that the first piston 18 comes to a central position in the first bore 11 and the steel ball 35 resets in the first piston small diameter portion 18c where it presents no hindrance to downward movement of the second piston 24, while at the same time hydraulic pressure from the front brake system FB is communicated to the second piston large diameter portion upper surface 24a through the passage 13, and, this pressure being sufficient to overcome the locking force of the lock spring 27, the lock spring 27 is gradually squeezed in by the narrowing flare portion 26a and then by the inner wall of the sleeve 26, and the second piston 24 is forced downwards as far as the second bore smallest diameter portion 12d and out of contact with the plunger 30, and the warning lamp 31 is thus switched off.

The operation of this device is the same if the front brake system FB fails first, with the exception that in this case initial pressure is stronger at the 18e of the first piston 18, which is therefore initially moved to the left, and that when pressure is increased at the end of the first bore 11 in connection with the rear brake system RB hydraulic pressure is also applied through the passage 13 to the second piston large diameter portion upper surface 24a and tends to cause the second piston 24 to move downwards, but since this pressure through the passage 13 is less than that applied to the first piston end surface 18d, the first piston 18 is nevertheless moved to the left, thus causing the steel ball 35 to be pushed from the small diameter portion 18b to the smallest diameter 18c, raise the second piston 24 and bringing about the operation described above with reference to initial rear brake system RB failure.

As described above, the present invention overcomes the disadvantages of conventional devices and presents a means whereby failure in a front or rear brake system of a dual hydraulic brake system causes a brake failure warning to be given, which warning continues until brakes are repaired, at which time the warning is stopped and its actuating switch is automatically reset in preparation for subsequent operation.

While it will be apparent that the preferred embodiment of the invention disclosed is well calculated to fulfill the its objects above stated, it will be appreciated that the invention is susceptible to modification, variation and change without departing from the spirit of the invention.

What is claimed is:

1. An automatically resetting, hydraulically controlled switch comprising a first pressure responsive means subjected to opposed hydraulic pressures at two ends thereof which while said pressures are normal lies in a neutral position and upon there being a certain difference in the pressures at its ends moves in the direction of lower pressure and causes a second pressure responsive means to move to a position where it actuates a switch, the second pressure responsive means being held in the switch actuating position until the pressures at the ends of the first pressure means are normalized, and switch resetting means responsive to the normalization of the pressures at the ends of the first pressure responsive means for communicating hydraulic pressure acting on the first pressure responsive means to the second pressure responsive means to cause the second pressure responsive means to move away from the switch actuating position, thereby resetting the switch.

2. An automatically resetting, fluid controlled switch comprising first fluid pressure responsive means having two ends directly acted upon by two opposed fluid pressures, the first fluid pressure responsive means being positioned in a neutral position when the two fluid pressures are normal and movable from the neutral position in the direction of lower pressure in response to a predetermined difference of the fluid pressures at the ends thereof, a second fluid pressure responsive means responsive to the movement of the first fluid pressure responsive means from the neutral position thereof for moving to a switch actuating position for actuation of a switch, and means for holding the second fluid pressure responsive means in the switch actuating position until the pressures at the ends of the first fluid pressure means are normalized and full fluid pressure restored at which time fluid pressure acting on the first fluid pressure responsive means is communicated to the second fluid pressure responsive means for directly acting thereon to cause the second fluid pressure responsive means to move away from the switch actuating position thereof, thereby resetting the switch.

3. An automatically resetting, fluid controlled switch according to claim 2, wherein said holding means includes lock ring means for locking the second fluid pressure means in the switch actuating position, and communicating means communicating the fluid pressure acting upon one end of the first fluid pressure responsive means to the second fluid pressure responsive means to overcome the force of the lock ring means when the fluid pressures are normalized and thereby cause movement of the second fluid pressure responsive means away from the switch actuating position thereof.

* * * * *